Aug. 3, 1954
W. R. BELL
2,685,101
WINDSHIELD WIPER ARM AND BLADE
Filed Oct. 14, 1950
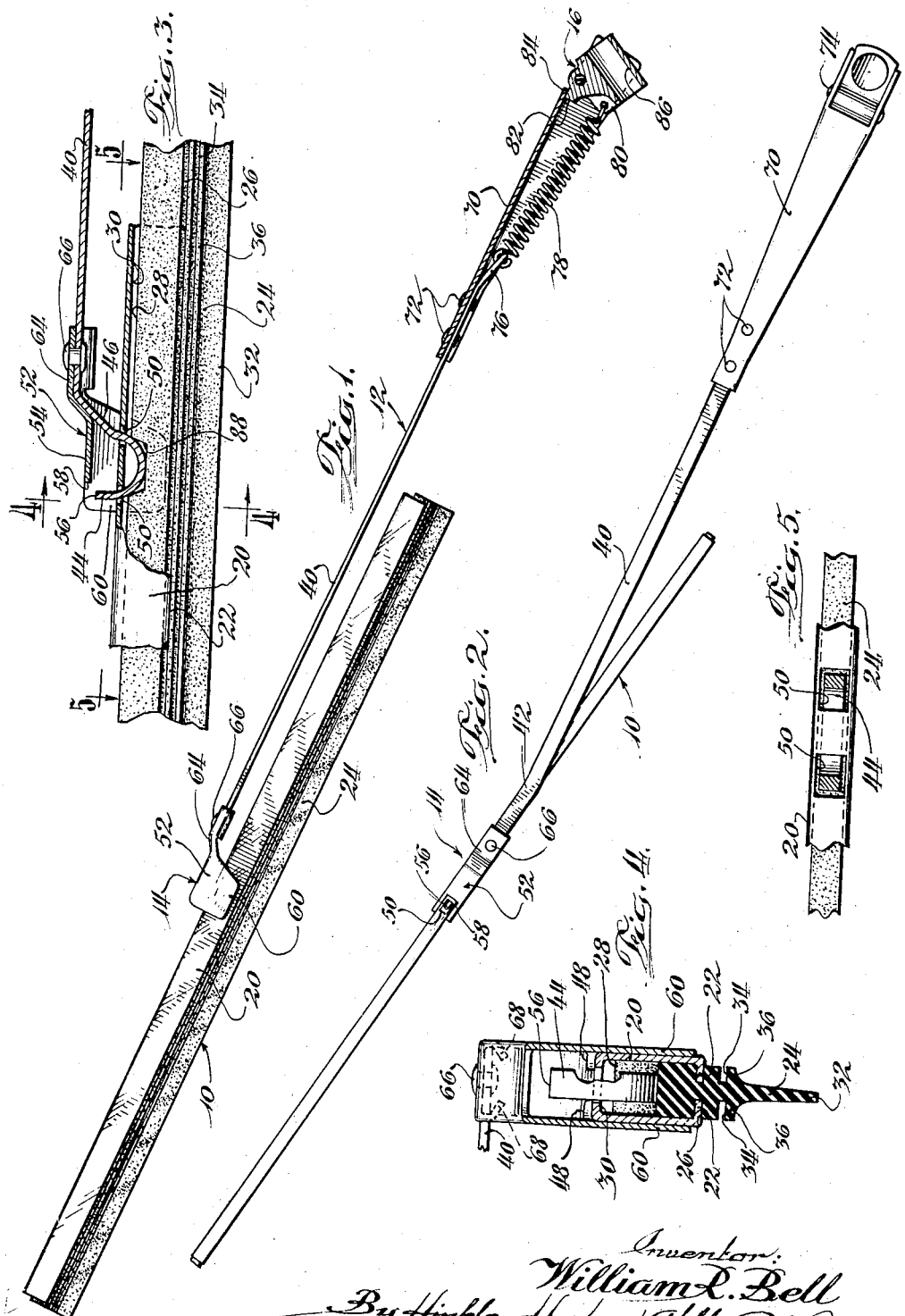
Inventor:
William R. Bell
By Hinkle, Horton, Ahlberg & Nipper
Attorneys.

Patented Aug. 3, 1954

2,685,101

UNITED STATES PATENT OFFICE 2,685,101

WINDSHIELD WIPER ARM AND BLADE

William R. Bell, Skokie, Ill., assignor to Stewart-Warner Corporation, Chicago, Ill., a corporation of Virginia Application October 14, 1950, Serial No. 190,077

5 Claims. (Cl. 15—250)

This invention relates to windshield wipers and more particularly to a windshield wiper arm and blade assembly.

An object of the invention is to provide a windshield wiper blade having a rubber squeegee which may be readily removed from and inserted into its supporting metal frame so that a worn out squeegee may be replaced conveniently.

A further object is to provide a wiper blade having a squeegee which is easily removable from the blade but is securely retained in the blade when the blade is assembled on its operating arm.

A further object is to provide a windshield wiper assembly having a wiper blade which is easily detachable from its operating arm but is firmly retained in operating position on the arm.

A further object is to provide a wiper assembly in which the wiper blade may be reversed on its supporting arm so that improper assembly of the blade and arm is impossible.

A further object is to provide extremely simple, rugged and economical means for linking the blade and supporting arm of a windshield wiper.

Further objects, advantages and characteristic features of the invention will become apparent from the following description of an illustrative embodiment taken in connection with the drawing, in which:

Fig. 1 is an elevational view of an illustrative wiper blade and arm, the hub portion of the arm being shown in section;

Fig. 2 is a plan view of the wiper assembly;

Fig. 3 is a fragmentary sectional elevational view of the wiper arm and blade on a somewhat large scale showing particularly the means for linking the blade and the arm;

Fig. 4 is an enlarged sectional view of the arm and blade taken on the line 4—4 of Fig. 3 and illustrating the means for linking the arm and the blade; and Fig. 5 is a fragmentary sectional plan view of the means linking the wiper arm and blade taken on the line 5—5 of Fig. 3.

The windshield wiper assembly shown in Figs. 1 and 2 includes a wiper blade 10 connected with a supporting arm 12 by means of a link 14. A hub 16 is pivotally mounted on the inner end of the supporting arm 12 for securing the arm to a windshield wiper drive shaft, not shown.

Referring to Fig. 4, as well as Fig. 1, the wiper blade 10 has an elongated metal frame 20 in the form of a narrow channel which is open toward the surface to be wiped by the blade. As shown, the channel frame 20 comprises a pair of substantially flat, generally parallel sides connected at their upper edges by a web 30. The lower edges of the channel sides are bent inwardly to form a pair of retaining flanges 22.

A narrow elongated squeegee 24 is slidably positioned within the channel-shaped frame 20. The squeegee and the frame have interlocking parts to restrain downward movement of the squeegee out of the frame. For example, the opposite sides of the squeegee may be provided with a pair of longitudinal grooves 26 for receiving the retaining flanges 22 of the frame 20. Adequate clearance is provided between the top surface 28 of the squeegee and the frame web 30 in order to facilitate sliding the squeegee in and out of the frame.

The squeegee is made of rubber or some other flexible rubberlike material. It tapers downwardly to a thin square cornered edge 32 for engaging the surface to be wiped. The opposite sides of the squeegee have a second pair of longitudinal grooves 34 located below the grooves 26, to form a pair of reinforcing ridges 36 extending longitudinally along the sides of the squeegee below the second grooves 34. The grooves 34 are provided to facilitate flexing of the squeegee at this point. The ridges 36 act as stops to limit the amount of flexing or "flop-over" of the squeegee at the grooves 34. The fit between the metal frame 20 and the squeegee 24 is loose enough so that the squeegee may readily be removed from the frame by sliding the squeegee longitudinally out of either end of the frame. Of course a new squeegee may readily be inserted in the frame to replace one which is worn out.

As seen in Figs. 1 and 2, the outer portion of the supporting arm 12 includes a thin narrow metal bar or ribbon 40. The bar 40 has an edgewise bend 42 in order to offset the outer end of the bar from the remainder of the supporting arm 12.

As best shown in Fig. 3, the extreme outer end of the bar 40 has the form of a downwardly convex hook or loop 44 which is connected with the straight portion of the bar 40 by a short inclined section 46.

As best shown in Fig. 4, the hook 44 is narrower than the remainder of the bar 40 to form a pair of abutment shoulders 48 where the hook intersects the inclined portion 46 of the bar. The hook 44 has a generally arcuate or semicircular shape, as shown in Fig. 3.

As best shown in Fig. 5, the top web of the channel-shaped metal frame 20 holding the squeegee 24 has a pair of longitudinally spaced apertures or slots 50 for receiving the semicircular hook 44. The slots are located midway between the ends of the metal frame and are spaced apart a distance corresponding generally with the diameter of the circular hook 44. It will be noted that the transverse or lateral dimension of the apertures is substantially less than the width of the frame 20.

A sheet metal guard 52 partly encloses the circular hook 44. The guard is generally channel shaped and has a top portion 54 positioned slightly above the upwardly directed outer end 56 of the hook 44. The top of the guard is recessed to provide an outer edge 58 positioned a short distance inwardly from the extreme outer end 56 of the hook. As best shown in Figs. 3 and 4, the guard 52 has a pair of substantially flat, generally parallel side skirts 60 which extend downwardly below the hook 44 to embrace snugly the channel-shaped metal frame 20 of the wiper blade 10. The sides 60 terminate approximately at the level of the brackets 22 at the lower edges of the metal frame 20. It will be appreciated that the face to face engagement of the flat guard skirts 60 with the generally parallel sides of the squeegee frame 20 support the frame against turning movement about its axis without restricting rocking movement of the frame about the hook 44 to follow the surface being wiped. Also, the flat, parallel relationship of the frame sides to the support skirts 60 facilitates sliding movement of the frame 20 into and out of assembled relationship to the guard 52.

The guard 52 is joined with the bar 40 by means of a stem portion 64 extending inwardly from the top 54 of the guard, the stem being offset upwardly from the top of the guard. The stem 64 of the guard is also channel shaped, and its top portion is secured to the outer end of the straight portion of the bar 40, just inside the inclined portion 46, by means of a single rivet 66.

As best shown in Fig. 4, the stem 64 has a pair of downwardly extending sides 68 which are crimped inwardly around the lower side of the bar 40.

As shown in Figs. 1 and 2 the inner end of the bar 40 is secured to the underside of the top of a sheet metal channel 70 by a pair of rivets 72. The channel 70 is tapered outwardly in both width and height.

The hub 16 is pivoted between the sides of the channel 70 near its inner end by means of a rivet 74. The rivet 74 extends through the upper outer corner of the hub 16, which is generally rectangular in shape.

The extreme inner end 76 of the bar 40 is bent downwardly inside the channel 70 and is perforated to receive one end of a coil spring 78 for applying pressure between the squeegee 24 and the surface to be wiped. The other end of the coil spring is hooked through a perforated lug 80 at the outer lower corner of the hub 16. Consequently the spring 78 tends to rotate the arm 12 downwardly or counterclockwise with respect to the hub 16. This relative rotation of the arm 12 and the hub 16 is limited by engagement of a stop 82, projecting from the hub near the rivet 74, with the inner edge 84 of the top of the channel 70, the inner edge being recessed outwardly to provide clearance for the top of the hub 16.

The hub 16 has a generally vertical opening 86 for receiving a windshield wiper shaft, not shown.

As best shown in Fig. 3, the upper edge of the squeegee 24 has a transverse notch 88 positioned midway between the ends of the squeegee for receiving the lowermost portion of the hook 44. Engagement of the notch 88 with the hook 44 prevents removal of the squeegee from the metal frame 20 when the blade 10 is in position on the arm 12.

The wiper blade 10 may be removed from the supporting arm 12 by rotating the blade clockwise as seen in Figs. 1 and 3. The hook 44 is thereby disengaged from the slots 50 as the outer end 56 of the hook passes first through the outer slot and then through the inner slot. Because the outer edge 58 of the top of the guard 52 is recessed inwardly from the outer end 56 of the hook, there is no interference between the metal frame 20 of the blade and the guard.

When the blade 10 is removed from the arm 12, the squeegee may be slipped out of the metal frame 20 and replaced if desired. The squeegee and the frame are dimensioned to provide clearance therebetween to facilitate removal of the squeegee. The blade may be replaced on the arm 12 by inserting the outer end 56 of the hook 44 downwardly through the inner slot 50 and then upwardly through the outer slot. The blade 10 is symmetrical so that it may be reversed with respect to the arm at will.

When the blade 10 is in place on the arm 12, and the hub 16 is mounted on a windshield wiper shaft, the arm 12 exerts pressure on the blade 10 through the shoulders 48, which engage the upper surface of the metal frame 20 of the blade. The blade is free to turn along the hook 44 throughout a considerable angle in order to maintain the blade in alignment with the surface to be wiped, and the shoulders 48 remain in contact with the blade as it turns.

The guard 52 which embraces the metal frame 20 of the blade serves as a guide to hold the blade 10 vertical and in its predetermined angular relationship with the arm 12, without excessive wobbling. Since removal of the blade from the arm requires rotating the blade through nearly 90°, the blade is positively retained on the arm during operation of the windshield wiper. Nevertheless the blade is easily removable.

Because of the simple and sturdy construction of the means for linking the blade with the arm, the arm and blade assembly is extremely economical. Further economies in use result from the fact that the squeegee may be replaced without replacing the metal frame of the blade. Only the squeegee is subject to appreciable wear in service, and replacement of the arm and blade should never be necessary since they are practically indestructible.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:
1. In a windshield wiper, a rigid elongated channel-shaped downwardly opening squeegee frame having a pair of longitudinally spaced apertures extending through its top web, an arm for carrying the squeegee frame, means for detachably connecting the frame to the arm including a downwardly convex arcuate hook extending downwardly from the arm through one of the apertures and then upwardly through the other, the hook including a portion having an increased transverse dimension to provide a shoulder immediately above the first mentioned aperture for transmitting downward forces from the arm to the frame, and a generally channel-shaped guard secured to the arm and snugly embracing the frame to maintain alignment between the frame and the arm, to prevent angular movement of the frame from the plane of said arcuate hook, and to prevent rotational movement of the frame about its longitudinal axis.

2. In a windshield wiper, a rigid elongated channel-shaped downwardly opening squeegee frame having a pair of longitudinally spaced apertures extending through its top web, an arm for carrying the squeegee frame, means for detachably connecting the frame to the arm including a downwardly convex arcuate hook extending downwardly from the arm through one of the apertures and then upwardly through the other, the hook including a portion having an increased transverse dimension to provide a shoulder immediately above the first mentioned aperture for transmitting downward forces from the arm to the frame, and means secured to the arm, operative while the frame and the arm are detachably connected together, for preventing angular movement of the frame from the plane of said arcuate hook, and for preventing rotational movement of the frame about its longitudinal axis.

3. A separable wiper assembly comprising, in combination, a channel-shaped squeegee frame open along one longitudinal side, a resilient squeegee slidably supported in said frame and forming a wiping edge extending beyond said open side thereof, a pair of longitudinally spaced apertures defined in the side of said frame opposite from said open side, said squeegee defining an open notch normally disposed in underlying relation to said apertures in facing relation thereto, a support arm, the forward end of said arm being turned toward said frame and fashioned to form abutment means engageable with said frame to transmit wiping forces thereto and a retaining hook rigid with said arm insertable through one of said apertures into said squeegee notch, said hook being curved to protrude outwardly through the other of said apertures, and guard means rigid with said arm to define a pair of side skirts having snug slidable engagement with opposite sides of said frame.

4. A separable wiper assembly comprising, in combination; an elongated channel frame including two substantially flat, generally parallel, longitudinal sides turned inwardly at the lower edges thereof to form squeegee retaining flanges; a pair of longitudinally spaced apertures defined in the side of said channel opposite from said flanges, means rigid with said arm forming a hook insertable through one of said apertures to extend into said channel and out through the other of said apertures, means rigid with said arm defining an abutment at the base of said hook for engaging said frame to apply wiping pressure thereto, and means rigid with said arm defining a pair of substantially flat side skirts snugly engaging opposite sides of said frame to transmit lateral forces thereto.

5. A windshield wiper assembly comprising, in combination, a channel-shaped squeegee frame open along one longitudinal side thereof, a resilient squeegee slidably supported within said frame and defining a wiping edge extending beyond said open side thereof, a pair of longitudinally spaced apertures formed in the side of said frame opposite from said wiping edge and having a transverse dimension somewhat less than the width of said frame, said squeegee defining an open notch normally disposed in underlying relation to said apertures in facing relation thereto, a support arm turned toward said frame and sharply necked down to define a pair of abutment shoulders and a narrowed hook extending from said shoulders through one of said frame apertures into said squeegee notch, whereby wiping pressure can be applied by said shoulders directly to said frame and said hook retains said squeegee in said frame, and said hook being turned upwardly to protrude out through the other of said frame openings to retain said frame in assembled relationship to said arm.

References Cited in the file of this patent

UNITED STATES PATENTS

| Number | Name | Date |
|---|---|---|
| 2,105,021 | Walton | Jan. 11, 1938 |
| 2,128,454 | Cullen | Aug. 30, 1938 |
| 2,147,113 | Smulski | Feb. 14, 1939 |
| 2,252,510 | Horton | Aug. 12, 1941 |
| 2,261,475 | Kautenberg | Nov. 4, 1941 |
| 2,274,277 | Rousseau | Feb. 24, 1942 |